United States Patent [19]

Yates et al.

[11] 4,037,940
[45] July 26, 1977

[54] MAGNIFYING LENS DEVICE

[75] Inventors: Howard D. Yates, Bradford; James A. Smyth, Wilcox; Paul A. Hajdu, Bradford, all of Pa.

[73] Assignee: Zippo Manufacturing Company, Bradford, Pa.

[21] Appl. No.: 613,211

[22] Filed: Sept. 15, 1975

[51] Int. Cl.² ............................................. G02B 7/02
[52] U.S. Cl. .................................. 350/242; 350/247
[58] Field of Search ................. 312/330 R, 332, 348; 350/183, 242, 247, 251, 252, 254, 256

[56] References Cited

U.S. PATENT DOCUMENTS

| 873,914 | 12/1907 | Vikoren | 312/332 |
|---|---|---|---|
| 2,432,760 | 12/1947 | Higbee | 312/330 |
| 2,534,100 | 12/1950 | Baumgartner | 312/348 UX |
| 2,746,347 | 5/1956 | Gaire | 350/242 |
| 3,409,347 | 11/1968 | Vogel | 350/242 |

Primary Examiner—F. L. Evans
Attorney, Agent, or Firm—Christel & Bean

[57] ABSTRACT

A magnifying lens assembly consists of a pair of generally rectangular superposed lens members which are housed in a generally rectangular casing and may be selectively withdrawn therefrom for use. A spring member is housed within the casing at each side of the lens members and consists of an abutment member at the front end thereof which is fixed in the open end of the casing and has a pair of spring leaves extending rearwardly therefrom, one for each lens member. The spring leaves are bowed toward the lens members to resiliently center the same in alignment with the casing and the abutment members define a guideway for the lens members at the open end of the casing.

4 Claims, 3 Drawing Figures

MAGNIFYING LENS DEVICE

BACKGROUND OF THE INVENTION

This invention relates to pocket magnifying glasses and particularly to devices of this type wherein one or more glasses are housed in a casing and are selectively withdrawn therefrom for use. More specifically, the device may comprise a pair of glasses housed in the casing in stacked relation whereby one or both of the glasses may be withdrawn to obtain various degrees of magnification.

Devices of this type known in the prior art have presented practical objections due to inadequate guidance of the glasses in the casing, lack of proper retention of the glasses in closed or housed position, and lack of simplicity in the manufacture and assembly of the component parts.

SUMMARY OF THE INVENTION

The magnifying glass structure of the present invention provides a one piece metal or plastic housing, a pair of magnifying lens members slidable into and out of the housing, and novel side guide members which act between the interior side walls of the housing and the side edges of the magnifying lens members to guide the latter for smooth and accurately located sliding movement into and out of the housing and also serve as detent means for the lens members when they are in housed position and as motion limiting elements for the lens members when they are withdrawn for use.

DESCRIPTION OF THE ILLUSTRATED EMBODIMENT

Figure 1:
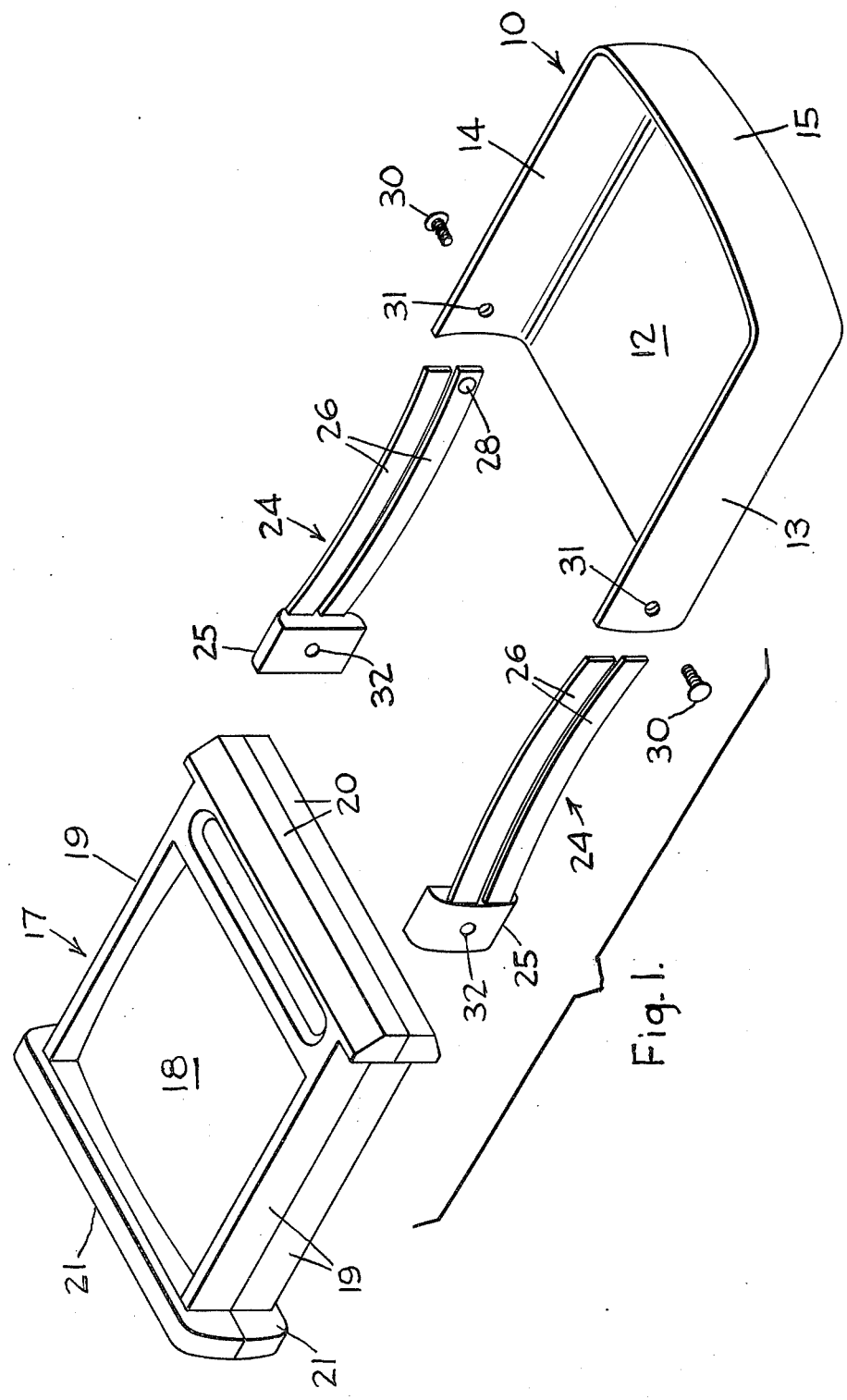
FIG. 1 is an exploded perspective view of one form of the magnifying glass device of the present invention.

In the drawings the numeral 10 designates generally a rectangular casing having an open end, top and bottom walls 11 and 12, side walls 13 and 14, and an end wall 15. In FIG. 1 the top wall 11 is broken away for clearer illustration. A pair of lens members are designated generally by the reference numeral 17 in FIG. 1 and each lens member comprises a unitary plastic molding of acrylic resin or equivalent transparent material.

Each lens member 17 comprises a plano-convex lens portion 18, a pair of side frame portions 19, a rear end portion 20, and a front end portion 21. The pair of lens members 17 are identical but are reversed in position in the assembly so that the flat surfaces of the lens portions 18 are toward each other.

Referring now to the means for guiding and controlling the movement of the lens members, a pair of plastic moldings comprising side spring members are designated generally by the numeral 24 in FIG. 1. Each of the spring members 24 includes an end block 25 having a pair of spring leaves 26 formed integrally therewith and extending lengthwise with respect to casing 10 in cantilever fashion from end block 25. The spring leaves 26 are bowed inwardly toward each other as clearly shown in FIG. 1.

It will be noted in FIG. 1 that a rounded protuberance 28 is provided at the inner face of the outer end of the lower spring leaf 26 of the spring member shown at the upper side of FIG. 1. The two spring members 24 are identical but reversed in position so that a similar protuberance 28 is present on the upper spring leaf 26 of the lower spring member 24 of FIG. 1.

Figure 2:
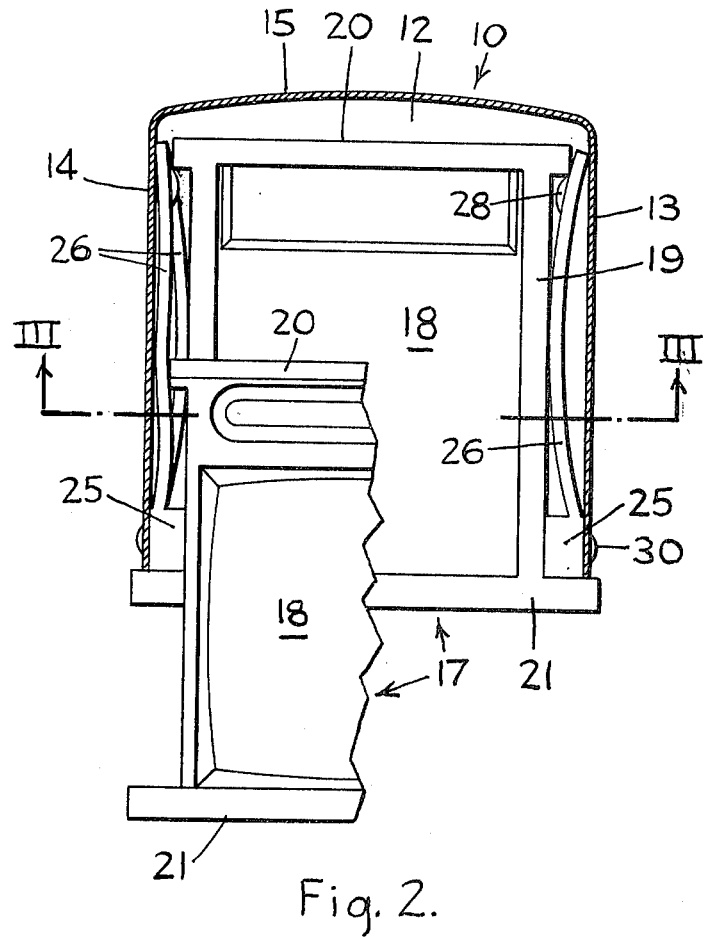
FIG. 2 is a top plan view of the device of FIG. 1 in assembled condition and with the top wall of the casing broken away for added illustration.
Figure 3:
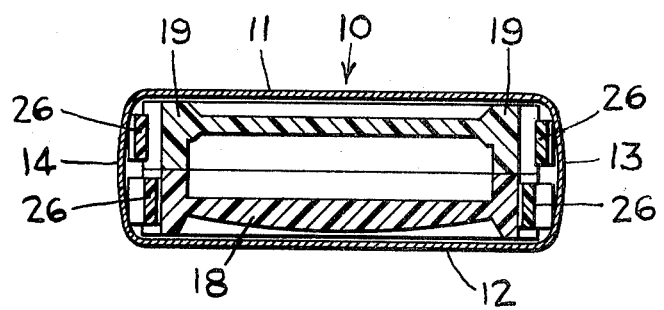
FIG. 3 is a cross sectional view on the line III—III of FIG. 2.

The protuberances 28 serve as resilient detents for the lens members 17 in their closed positions, as illustrated at the right hand side of FIG. 2 and as will presently be described in further detail. The lens members 17 and spring members 24 are permanently assembled in casing 10 in a novel manner which will now be described.

In effecting assembly the two lens members 17 and the two spring members 24 are grouped together with the spring members in approximately the positions shown in FIG. 2 relative to the lens members and the group of four members is inserted into the open end of casing 10. Fasteners such as drivescrews or self-tapping screws or the like 30 are inserted through perforations 31 in the side walls 13 and 14 of casing 10 and into perforations 32 in the end blocks 25 of the spring members to permanently retain the latter in casing 10. With the lens members in the closed position thus established, it will be noted that the protuberances 28 engage the extended side portions of rear end portion 20 of each lens member and thus resiliently retain each lens member in closed position. Inward movements of the lens members in the casing 10 are limited by engagement of the opposite side portions of front end portion 21 against the open end of casing 10.

When a lens member is manually withdrawn it is guided between front endblocks 25 of the spring members as clearly shown in FIG. 2 and the rear end portions of the lens members move along the inner surfaces of the opposite spring leaves 26 as shown at the left-hand side of FIG. 2 whereby a lens member is further guided and resiliently restrained in its movement to fully withdrawn position. As a lens member is moved outwardly the opposite side ends of its rear end portion 20 engage securely against the end blocks 25 of the spring members to prevent further withdrawing movement of a lens member.

From the foregoing it will be seen that either one or both of the lens members 17 may be withdrawn for use to give selectively different degrees of magnification. By the foregoing arrangement the lens members are resiliently held in all positions from fully withdrawn to fully housed positions whereby there is no tendency to rattle or become misaligned with respect to the housing and whereby the lens members are resiliently but securely guided for inward and outward movement with respect to the casing.

A preferred embodiment of the present invention has been described herein and shown in the accompanying drawings to illustrate the underlying principles of the invention but it is to be understood that numerous modifications may be made without departing from the broad spirit and scope of the invention.

We claim:

1. In a magnifying lens assembly, an open ended generally rectangular casing, a pair of lens members movable into and out of said casing, and spring means at opposite sides of the interior of said casing for cooperation with said lens members, each of said spring means comprising an integral member including an abutment portion within and adjacent to the open end of said casing and fixed thereto and a pair of spring leaves integral with said abutment portion and extending rearwardly therefrom and bowed laterally toward said lens members, each of said lens members having lateral extensions at its rear end for engagement with said abutment portions to limit outward movement of said lens members and for engaging laterally against said spring leaves to guide and center said lens members into alignment with said casing, said abutment portions being proportioned to provide guideways and centering means for said lens members at the open end of said casing.

2. A magnifying lens assembly according to claim 1 wherein at least one spring leaf for each lens member has a detent formation engageable with a rear portion of said lens member to releasably retain the same in closed position.

3. In a magnifying lens assembly, an open ended generally rectangular casing, a lens member movable into and out of said casing, and spring means at opposite sides of the interior of said casing for cooperation with said lens member, each of said spring means comprising an integral member including an abutment portion within and adjacent to the open end of said casing and fixed thereto and a spring leaf integral with said abutment portion and extending rearwardly therefrom and bowed laterally toward said lens member, said lens member having lateral extensions at its rear end for engagement with said abutment portions to limit outward movement of said lens member and for engaging laterally against said spring leaves to guide and center said lens member into alignment with said casing, said abutment portions being proportioned to provide a guideway and centering means for said lens member at the open end of said casing.

4. A magnifying lens assembly according to claim 3 wherein at least one spring leaf has a detent formation engageable with a rear portion of said lens member to releasably retain the same in closed position.

* * * * *